United States Patent
Sanchez

(10) Patent No.: US 6,741,166 B1
(45) Date of Patent: May 25, 2004

(54) SECURITY APPARATUS FOR MOTOR VEHICLE ELECTRONIC ACCESSORY UNIT

(76) Inventor: Aramis Sanchez, P.O. Box 217, Bronx, NY (US) 10463

( * ) Notice: Subject to any disclaimer, the term of this patent is extended or adjusted under 35 U.S.C. 154(b) by 209 days.

(21) Appl. No.: 10/123,126

(22) Filed: Apr. 16, 2002

(51) Int. Cl.[7] .............................................. B60R 25/10
(52) U.S. Cl. ...................... 340/426.34; 70/18; 70/49; 70/58; 292/323
(58) Field of Search .................... 340/426.34, 427; 70/58, 258, 18, 49; 180/287; 248/551–553; 292/317–323, 327

(56) References Cited

U.S. PATENT DOCUMENTS

| | | | |
|---|---|---|---|
| 3,590,608 A | * | 7/1971 | Smyth et al. ................... 70/15 |
| 4,003,228 A | | 1/1977 | Lievens et al. ................. 70/58 |
| 4,065,946 A | | 1/1978 | Loynes et al. ................. 70/58 |
| 4,235,492 A | | 11/1980 | Conger ........................ 312/242 |
| 4,553,414 A | | 11/1985 | Caputo et al. ................. 70/58 |
| 4,582,290 A | | 4/1986 | Baron ......................... 248/551 |
| 4,726,789 A | | 2/1988 | Yaffe ........................... 439/567 |
| 4,884,646 A | | 12/1989 | Zambias ...................... 180/90 |
| 4,912,952 A | | 4/1990 | Magrobi ....................... 70/199 |
| 5,388,434 A | | 2/1995 | Kalis ............................. 70/58 |
| 5,524,859 A | | 6/1996 | Squires et al. .............. 248/551 |
| 5,647,620 A | * | 7/1997 | Kuenzel ...................... 292/317 |
| RE36,075 E | | 2/1999 | Jonic ........................... 340/426 |
| 6,003,348 A | * | 12/1999 | McCrea ......................... 70/18 |
| 6,131,969 A | * | 10/2000 | Natkins ....................... 292/323 |
| 6,316,778 B1 | | 11/2001 | Goodman et al. .......... 250/551 |

* cited by examiner

Primary Examiner—Brent A. Swarthout
(74) Attorney, Agent, or Firm—Michael I Kroll

(57) ABSTRACT

Security apparatus for preventing the theft of motor vehicle electronic accessory units, such as compact disk players and radios, includes a specially configured cable and attachment apparatus for preventing forward movement of the unit from the dash toward the passenger compartment.

16 Claims, 8 Drawing Sheets

SECURITY APPARATUS FOR MOTOR VEHICLE ELECTRONIC ACCESSORY UNIT

BACKGROUND OF THE INVENTION

1. Field of the Invention

The present invention relates generally to security locking devices and, more specifically, to automotive electronic accessory units, such as audio equipment security locking apparatus. The present invention deters theft by adding an unobtrusive locking apparatus that is not easily visible and will deter theft because of the increased time and inconvenience in determining what is preventing the removal of the accessory unit.

Theft of automobile components has many various stereotypical forms, one of them being the quick break-in to the passenger compartment and removal of accessory units that are designed for easy removal for purposes of maintenance. Therefore it is the ease of removal that encourages and is of utmost importance to the thief

2. Description of the Prior Art

There are other locking devices designed for immobilizing a device to a structure. Typical of these is U.S. Pat. No. 4,003,228 issued to Lievens et al. on Jan. 18, 1977.

Another patent was issued to Loynes et al. on Jan. 3, 1978 as U.S. Pat. No. 4,065,946. Yet another U.S. Pat. No. 4,235,492 was issued to Conger on Nov. 25, 1980 and still yet another was issued on Nov. 19, 1985 to Caputo et al. as U.S. Pat. No. 4,553,414.

Another patent was issued to Baron on Apr. 15, 1986 as U.S. Pat. No. 4,582,290. Yet another U.S. Pat. No. 4,726,789 was issued to Yaffe on Feb. 23, 1988. Another was issued to Zambias on Dec. 5, 1989 as U.S. Pat. No. 4,884,646 and still yet another was issued on Apr. 3, 1990 to Magrobi as U.S. Pat. No. 4,912,952.

Another patent was issued to Kalis on Feb. 14, 1995 as U.S. Pat. No. 5,388,434. Yet another U.S. Pat. No. 5,524,859 was issued to Squires et al. on Jun. 11, 1996. Another was issued to Jonic on Feb. 2, 1999 as U.S. Pat. No. Re. 36,075 and still yet another was issued on Nov. 13, 2001 to Goodman et al. as U.S. Pat. No. 6,316,778.

U.S. Pat. No. 4,003,228

Inventor: James Lee Lievens, et al.

Issued: Jan. 18, 1977

A citizen band radio is secured within a vehicle by a high strength cable which is coupled to the radio by a locking device mounted on the antenna connector of the radio.

U.S. Pat. No. 4,065,946

Inventor: Leslie M. Loynes et al.

Issued: Jan. 3, 1978

A tamper proof attachment system is provided to secure a device such as a radio or tape deck in a vehicle. The looped cable passes through an anchoring point and the ends of the looped cable are locked and pass through an attachment device. The attachment device housing has an aperture in one end through which a mounting bolt is positioned and the head of the bolt is free to turn within the housing. The mounting bolt also passes through a mounting bracket and is threaded into a mounting surface of the vehicle. An open end of the attachment device housing is closed by a plug to cover the head of the bolt. In one embodiment the plug has apertures which align with apertures in the housing to permit the cable to pass through and to retain the plug in place. The device such as a tape deck or radio is fastened to the mounting bracket by bolts having tamper proof mounting covers according to the invention.

U.S. Pat. No. 4,235,492

Inventor: Thurman W. Conger

Issued: Nov. 25, 1980

A pair of parallel support members extend behind and perpendicularly to the dashboard of an automotive vehicle at the sides of the opening of the dashboard. Guide devices are provided on the sides of the unit housing of audio equipment and on the support members in cooperative engagement for slidably mounting the unit housing behind the dashboard. The dashboard has a hole formed therethrough in close proximity with the opening therethrough. A slot is formed through the top or bottom of the unit housing equidistant from the sides thereof intermediate the front and back of the unit housing. A pin is secured in the unit housing in operative proximity with the slot and is accessible via the slot. The pin and the slot are mutually perpendicular. A key-operated lock is mounted in the hole through the dashboard. A securing arm is rotatably affixed to the lock behind the dashboard and is rotatable by a key in the lock to an unlocked position in which the arm is in spaced relation with, and at a distance from, the unit housing and the slot and pin of the unit housing whereby the audio equipment unit is freely removable from the dashboard, and to a locked position at an angle with the unlocked position in which the arm extends through the slot and is hooked to the pin and locked in position whereby the arm obstructs movement of the unit housing through the opening of the dashboard so that the unit is secured behind the dashboard.

U.S. Pat. No. 4,553,414

Inventor: Mario A. Caputo et al.

Issued: Nov. 19, 1985

A security cover for automobile in-dash mounted audio equipment provides a protective theft defeating barrier. The cover includes a lock cylinder adapted for removably securing the cover to internal support rods which are pivotally anchored at one end to a portion of the automobile body. The lock cylinder has a shaft which is threadably received in the other end of the support rod. The cylinder can be rotated by a key for urging the cover into engagement with the dashboard and, thus, encasing the audio equipment.

U.S. Pat. No. 4,582,290

Inventor: Jeffrey N. Baron

Issued: Apr. 15, 1986

Automobile radio or tape deck retainer including a bracket to fit over the protruding adjustment shaft of the radio, connected to a flexible, sever-resistant cable extending from the bracket along the side of the radio to a structural portion of the automobile, to which the cable is secured.

U.S. Pat. No. 4,726,789

Inventor: Moshe Yaffe

Issued: Feb. 23, 1988

Anti-theft audio component mounting apparatus is provided in accordance with the teachings of the present invention. A sleeve member specifically configured to easily mount within a vehicle dashboard is arranged to be tightly secured and mounted within such dashboard and accept all connections provided in the dashboard for a dash mounted audio component. A cap member for accepting all electrical connections from a selected audio component is provided for mounting over an end portion of the selected audio component in such manner as to seal the end portion of the audio component. The cap member is provided with a plurality of externally available, recessed contacts and the sleeve member is provided with a corresponding plurality of internally disposed contacts. This enables a selected audio component having the cap member mounted thereon to be placed into the sleeve member to house the audio component and cause each of the plurality of internally available recessed contacts in the cap member to engage a corresponding one of the plurality of internally disposed contacts establishing interconnection therebetween while allowing the selected audio component and mounted cap member secured hereto to be removed from the sleeve for retention by a user during periods when said vehicle is at risk.

U.S. Pat. No. 4,884,646

Inventor: Robert A. Zambias

Issued: Dec. 5, 1989

An anti-theft device for audio equipment which is accessible through an opening in a frame of an automotive vehicle, includes a rectangular sliding door movable in a vertical direction between a closed position in blocking relation to the opening and an open position permitting access to the audio equipment through the opening; a trackway which guides movement of the sliding door between the open and closed positions; a lead screw rotatably connected with the frame; a support nut connected with the sliding door for threadedly receiving the lead screw; a first gear fixedly mounted on the lead screw; a motor secured to the frame and having an output shaft with a second gear at the free end thereof, the second gear being in meshing engagement with the first gear; an actuation switch for selectively actuating the motor only when the ignition switch of the vehicle is on, to cause the sliding door to move along the trackway between the open and closed positions.

U.S. Pat. No. 4,912,952

Inventor: Judd M. Magrobi

Issued: Apr. 3, 1990

A locking device is provided for use in a motor vehicle. A panel is mounted on the floor of the motor vehicle between the vehicle control pedals and the driver's seat, the panel being dimensioned substantially to prevent access to the control pedals. The device includes a hinge mounting for the panel whereby the panel can be hinged out of the way of the pedals and locking means adapted releasably to lock the panel in an operative position in which it prevents access to the control pedals. The locking device includes a vehicle radio theft prevention device comprising a cable adapted for attachment to a vehicle radio or the like and to be fixed releasably to an anchorage provided on the inside of the housing.

U.S. Pat. No. 5,388,434

Inventor: Robert M. Kalis

Issued: Feb. 14, 1995

A theft prevention device for use in the mounting of automotive audio equipment, such as a two-way radio to a secure structure, such as a "U" bracket or trunion. The invention is a generally conical-shaped mounting knob that threadably attaches the audio equipment to the mounting bracket. Attached to one end of the knob enclosure is a key lock and attached to the opposite end is a threaded stud that is able to rotate about the longitudinal axis of the enclosure. In operation, the knob, in its unlocked position, is rotated clockwise until the threaded stud is securely attached to its threaded counterpart on the radio. In this position, the lock assembly rotates a cam plate so that an engaging disc engages both the knob enclosure and a stud plate allowing torque applied to the enclosure to be transferred to the threaded stud. The knob is then locked. In this position, the lock assembly rotates the cam plate so that the engaging disc does not engage the stud plate, and a compression spring forcibly separates the engaging disc and stud plate. Torque is not transferred from the enclosure to the stud plate. The knob will rotate freely in either the clockwise or counter-clockwise direction, but the stud will not loosen or tighten, thus preventing removal of the radio from the vehicle.

U.S. Pat. No. 5,524,859

Inventor: Carlton G. Squires, et al.

Issued: Jun. 11, 1996

An anti-theft mounting for radios, stereos and similar audio equipment used in motor vehicles has several features to discourage and possibly prevent the theft of equipment. The audio equipment is mounted within an opening in a dash of a motor vehicle. The equipment is partially mounted within a housing which moves forward so that a front of the equipment extends out of the opening when the equipment is desired to be used and moves rearward when the equipment is not desired to be used. When the equipment is in the rearward rest position, a door closes the opening. When the equipment is desired to be operated, the door opens and the equipment protrudes at least partially from the opening for easy access. The opening is sized so that while the equipment will fit snugly through the opening, the housing will not. The door and the equipment are controlled by worm gears. One worm gear controls the forward and rearward movement of the housing and audio equipment and two additional worm gears control the door. The use of worm gears allows locks to be eliminated. When a person legitimately desires to remove the equipment, this can be accomplished easily with special tools. Previous anti-theft devices for radios and the like do not provide sufficient protection for the radio or do not provide appropriate access to the radio when it is desired to be used.

U.S. Pat. No. Re. 36,075

Inventor: Danko Jonic

Issued: Feb. 2, 1999

An anti-theft system is described adaptable to any motor vehicle have a removable accessory electronic unit such as a high-fidelity stereo component unit installed within a mounting bracket and sidably detachable therefrom. Upon leaving the car, the vehicle owner takes along the entire accessory unit, or alternatively takes only a detachable front control panel from the unit, for secure safekeeping or to be retained in the personal possession of the owner. At the same time, continuity of the electrical circuit supplying current from the storage battery to the motor vehicle fuel pump (or ignition switch, or other control component of the vehicle)

is interrupted, thus preventing normal operation of the vehicle and protecting against unauthorized use.

U.S. Pat. No. 6,316,778

Inventor: Gary Goodman, et al.

Issued: Nov. 13, 2001

The invention is a theft deterrent arrangement for a motor vehicle audio apparatus wherein the audio apparatus is enabled when an optoelectronic circuit is closed by a security bezel removably seated in a recess in a front face of the audio apparatus. The security bezel has a light pipe, so that when the security bezel is seated in the recess, the light pipe provides an optical path between a light detector and an emitter fixedly mounted in the recess, thereby closing the optoelectronic circuit and enabling the audio apparatus.

While these locking devices may be suitable for the purposes for which they were designed, they would not be as suitable for the purposes of the present invention, as hereinafter described.

It is thus desirable to provide an electronic accessory unit installation that prevents the removal of the unit from the dash into the passenger compartment.

SUMMARY OF THE PRESENT INVENTION

A primary object of the present invention is to provide an additional attachment means to secure a motor vehicle electronic accessory unit in a dash.

Another object of the present invention is to provide security apparatus having a mounting plate that can be attached to the housing of electronic accessory units and then attached to motor vehicle structure outside the passenger compartment.

Still yet another object of the present invention is to provide a security device comprising a steel cable having a grounding wire attached thereto.

A yet further object of the present invention is to provide a relatively easily installed security device that is effective in deterring the theft of mobile entertainment devices.

A still yet further object of the present invention is to provide deterrence of theft of electronic accessory units by increasing the time in detecting and defeating the installation of the present invention.

Another object of the present invention is to provide additional means of attachment for the electronic accessory unit in the dash without making any modifications or alterations to the unit or the automobile structure.

Another object of the present invention is to provide consumers a heightened sense of security, thus giving them the confidence to purchase better quality electronic accessory units.

Additional objects of the present invention will appear as the description proceeds.

The present invention overcomes the shortcomings of the prior art by providing a mechanical security apparatus to secure an electronic accessory unit without electronic wiring that can lead to electrical failure or keyed devices that could result in lost or stolen keys.

The present invention is a securing device for motor vehicle electronic accessory units using a universal mounting plate attached to a steel cable and a grounding wire attached thereto, and an attachable detachable fastener fixedly positioned to the other end of the steel cable. The detachable fastener is a U-bolt assembly positioned on the remote distal end of the cable whereby the cable can be wrapped around a vehicle structure outside the passenger compartment, and the cable end secured so as to leave the cable in tension.

Being in tension, the steel cable thereby prevents the electronic accessory unit from being pulled forward from the dash into the passenger compartment, thus preventing the cable from being exposed and cut. This added securing apparatus provides the additional means to cause a thief difficulty, delay and unnecessary risk in attempting the theft. Hence the theft is thwarted.

The present invention is intended to secure the entertainment system mounted within the dashboard of an automobile by mounting the universal mounting plate to the chassis of the protected device, feeding the steel cable through a hole leading out of the passenger compartment and securing the opposite end of the steel cable to rigid vehicle structure outside the passenger compartment.

My invention provides an improved electronic accessory unit of the type installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, wherein the improvement comprises: an elongated flexible member having a first end and a second end; a first attachment device for attaching the elongated flexible member first end to the accessory unit rear side; and a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member.

In one embodiment, the accessory unit has a threaded hole and wherein the first attachment device further comprises a mounting plate connected to the elongated flexible member first end, the plate having a hole, and a threaded fastener, the first attachment device hole receiving the threaded fastener and the accessory unit rear side threaded hole threadably receiving the threaded fastener.

In one embodiment, the elongated flexible member is welded to the mounting plate.

In one embodiment, the second attachment device is a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening.

In one embodiment, the motor vehicle has a grounding structure and wherein the unit further comprises a ground member, the ground member having a first end, connected in proximity and in electrical communication to the elongated flexible member first end, and a second end for connecting to the motor vehicle grounding structure.

There is provided, in combination with an electronic accessory unit installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, a security apparatus comprising: an elongated flexible member having a first end and a second end; a first attachment device for attaching the elongated flexible member first end to the accessory unit rear side; and a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member.

My invention provides an improved an electronic accessory unit of the type installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, wherein the improvement comprises: an elongated flexible member having a first end and a second end; first end attachment means for attaching the elongated flexible member first end to the accessory unit rear side; and second end attachment means for attaching the elongated flexible member second end to at least one of the motor vehicle rigid members, the second end attachment means being adapted for tightening the elongated flexible member prior to the attachment, such that movement of the accessory unit from the dash receptacle is stopped by the elongated flexible member.

In one embodiment, the motor vehicle has a grounding structure and wherein the apparatus further comprises grounding means for connecting to the motor vehicle grounding structure.

There is provided, in combination with an electronic accessory unit installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, a security apparatus comprising: an elongated flexible member having a first end and a second end; first end attachment means for attaching the elongated flexible member first end to the accessory unit rear side; and second end attachment means for attaching the elongated flexible member second end to at least one of the motor vehicle rigid members, the second end attachment means being adapted for tightening the elongated flexible member prior to the attachment, such that movement of the accessory unit from the dash receptacle is stopped by the elongated flexible member.

My invention provides an improved electronic accessory unit of the type installed in a motor vehicle having a rear panel and a dash, the accessory unit having a front side and a rear side and a threaded hole, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, the motor vehicle further having a grounding structure, wherein the improvement comprises: an elongated flexible member having a first end and a second end; a first attachment device for attaching the elongated flexible member first end to the accessory unit rear side, the first attachment device having a mounting plate welded to the elongated flexible member first end, the plate having a hole, and a threaded fastener, the first attachment device hole receiving the threaded fastener and the accessory unit rear side threaded hole threadably receiving the threaded fastener; a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member, the second attachment device comprising a U-bolt having a closing.member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening; and a ground member, the ground member having a first end, connected in proximity and in electrical communication to the elongated flexible member first end, and a second end for connecting to the motor vehicle grounding structure.

There is provided, in combination with an electronic accessory unit installed in a motor vehicle having a rear panel and a dash, the accessory unit having a front side and a rear side and a threaded hole, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, the motor vehicle further having a grounding structure, a security apparatus comprising: an elongated flexible member having a first end and a second end; a first attachment device for attaching the elongated flexible member first end to the accessory unit rear side, the first attachment device having a mounting plate welded to the elongated flexible member first end, the plate having a hole, and a threaded fastener, the first attachment device hole receiving the threaded fastener and the accessory unit rear side threaded hole threadably receiving the threaded fastener; a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member, the second attachment device comprising a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening; and a ground member, the ground member having a first end, connected in proximity and in electrical communication to the elongated flexible member first end, and a second end for connecting to the motor vehicle grounding structure.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE REFERENCED NUMERALS

Figure 1:
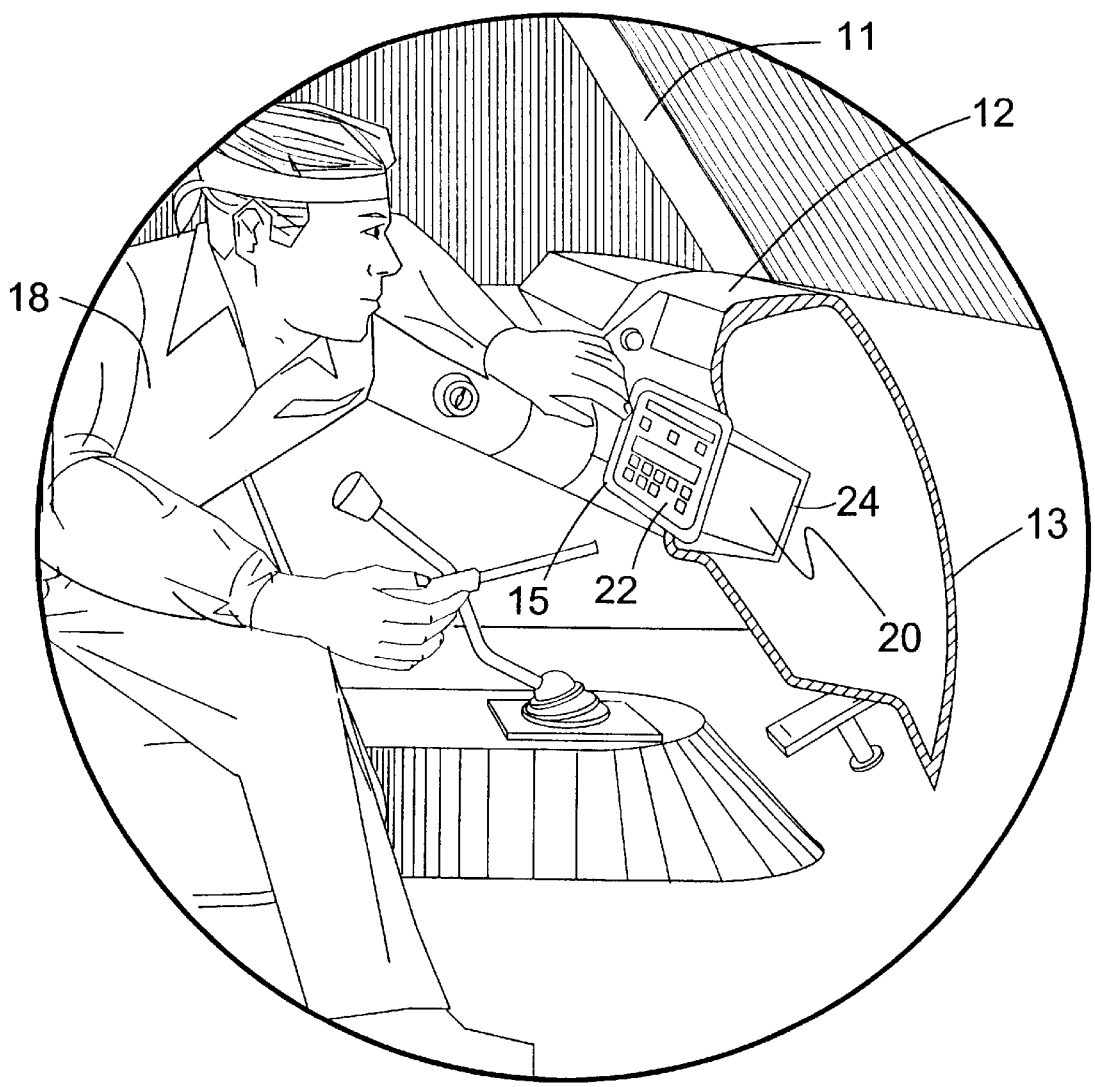
FIG. 1 is an illustrative view of a prior art electronic accessory unit installation. Automobiles are broken into on a daily basis with the outcome usually being the loss of the audio or multimedia components. Additionally, products on the market, such as detachable faceplates, rarely work because people usually place the radio in the glove compartment thus rendering the detachable faces useless. Even with security protection a theft can by-pass them and remove a unit using simple tools. Unfortunately, these entertainment systems are not generally able to be securely mounted to the interior of an automobile.

Turning now descriptively to the drawings, in which similar reference characters denote similar elements throughout the several views, the figures illustrate the present invention. With regard to the reference numerals used, the following numbering is used throughout the various drawing figures.

10 Security Apparatus for Motor Vehicle Electronic Accessory Unit of the present invention
11 motor vehicle
12 dash
13 rear panel
14 rear panel hole
15 dash receptacle
16 motor vehicle rigid member
17 dash components
18 thief
20 electronic accessory unit
22 unit front side
24 unit rear side
26 cable
28 mounting plate
30 mounting plate bolt
32 cable first end
34 weld
40 U-bolt
42 U-bolt closing member
44 closing member transverse channel
46 closing member aligned channel
48 U-bolt nut
50 cable second end
52 ground wire
54 ground wire attachment

DETAILED DESCRIPTION OF EXEMPLARY EMBODIMENTS OF THE INVENTION

The following discussion describes in detail exemplary embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 2:
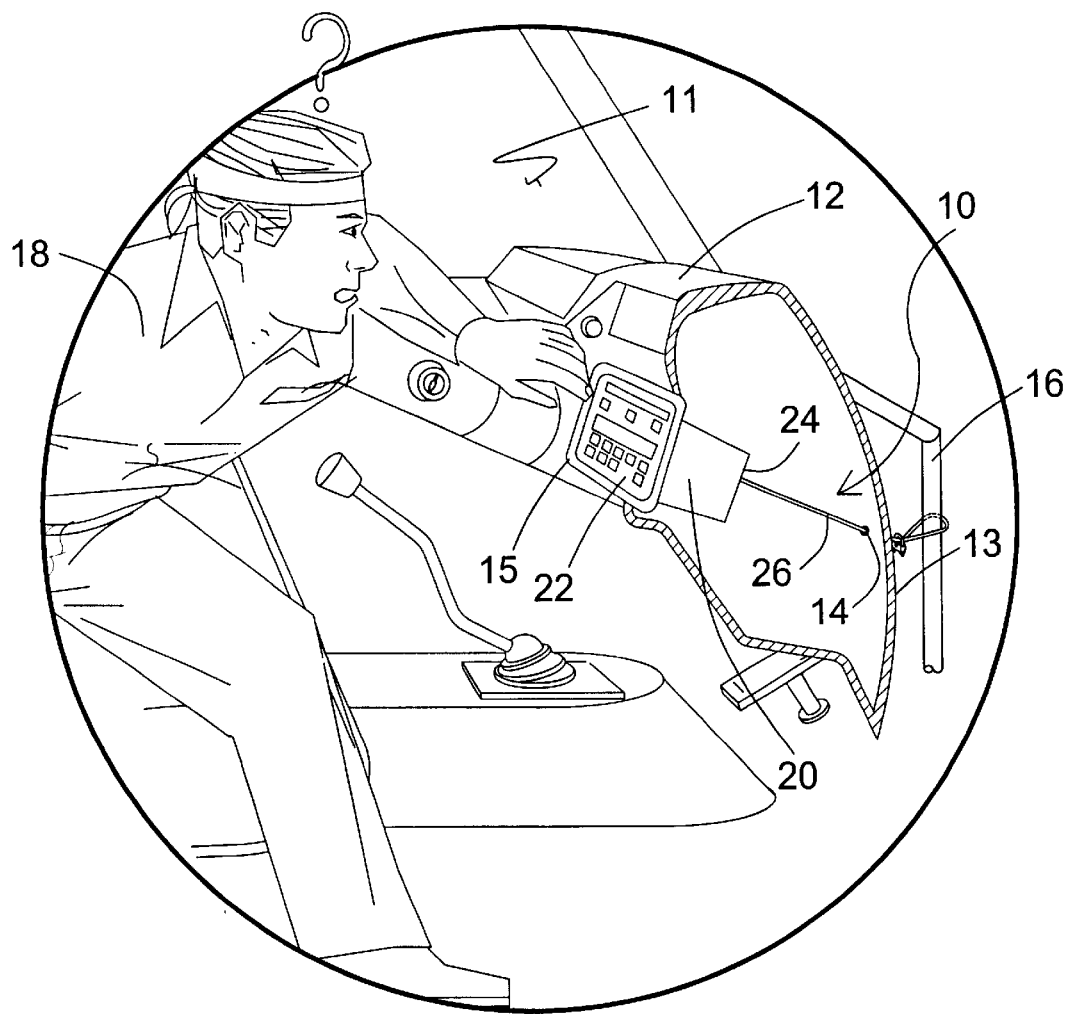
FIG. 2 is an illustrative view of the present invention in a passenger car installation.
Figure 8:
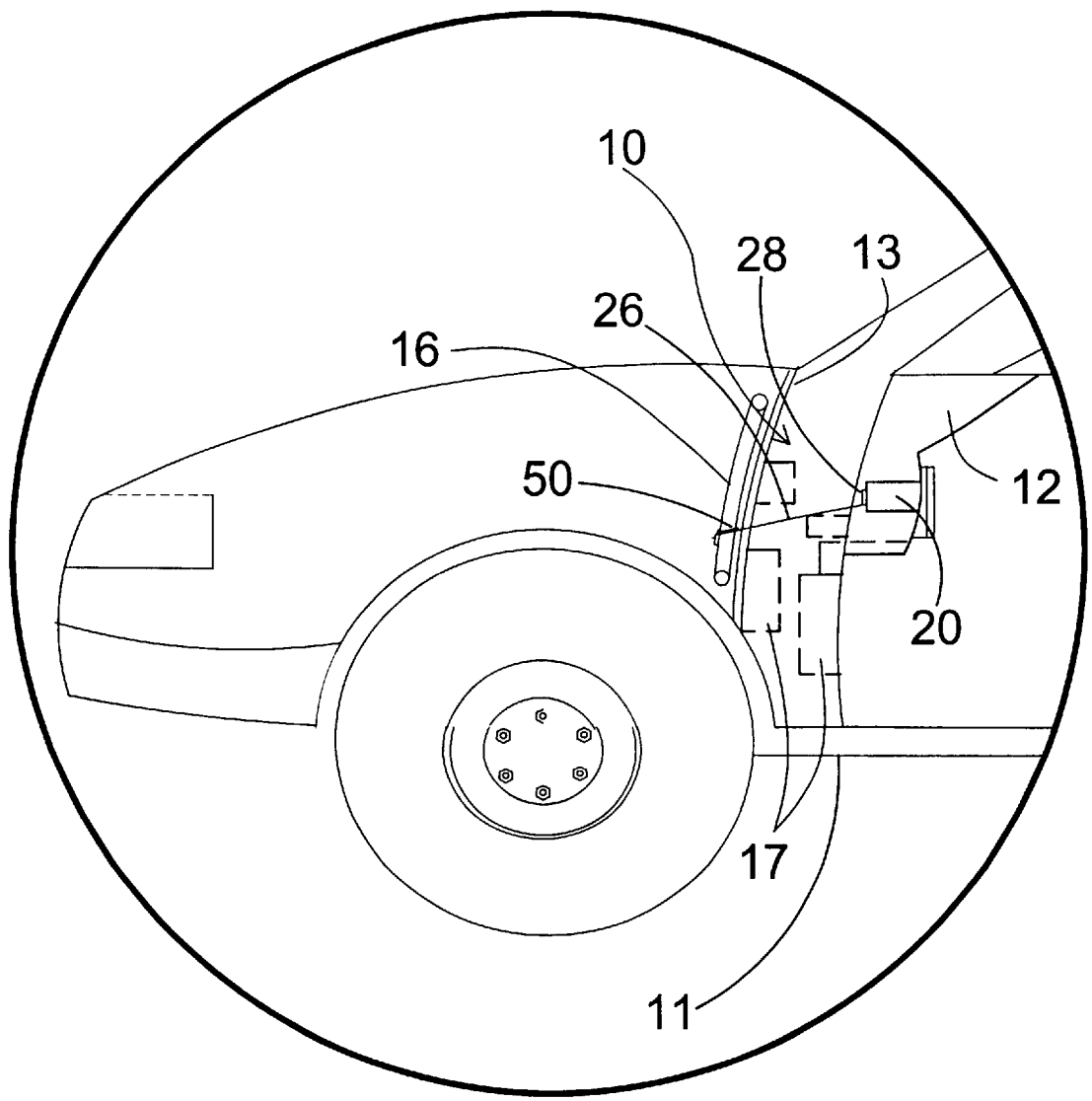
FIG. 8 is a side view of the front portion of the motor vehicle with the internal components of the present invention mounted shown.

As shown in FIG. 1, FIG. 2 and FIG. 8, a typical motor vehicle 11 has a dash 12 forward of a rear panel 13, the rear panel 13 typically being, or including, a firewall, floor pan, or other structure that serves to separate the passenger compartment from the engine compartment and outside environment. Beyond the rear panel 13, and out of the passenger compartment, the vehicle 11 will typically have numerous rigid members 16 as part of different vehicle assemblies, including the frame, steering linkage, and others.

Forward of the rear panel 13, the dash 12 includes a large variety of structures 17 serving different purposes, including components such as air conditioning conduits, wiring conduits, steering columns, and the like. Modern automobiles 11 include a very compactly designed dash 12 where such structures 17 are assembled such that very little space in the dash 12 area is wasted. Such structures are shown representatively in FIG. 5.

Figure 5:
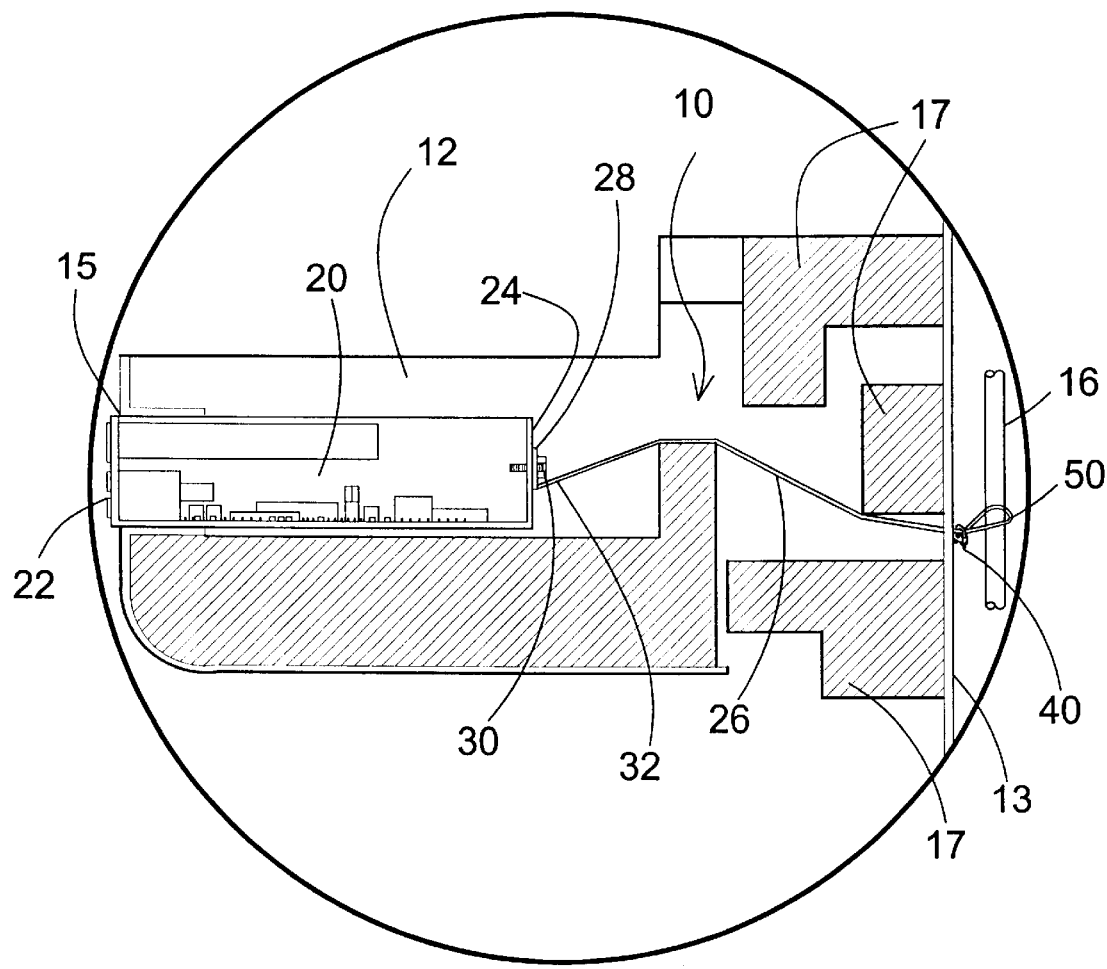
FIG. 5 is a sectional side view of the dash showing representative structure in the dash that is circumvented by the cable as it is threaded out of the passenger compartment to a rigid vehicle member.

FIG. 5 also shows that the dash 12 has a receptacle 15 into which is inserted a variety of electronic accessory units 20, such as radios, cassette players, compact disc players, and the like. The passenger typically operates the accessory unit using controls on the accessory unit front face 22, with a rear side 24 having been inserted through the receptacle 15 during installation. The above-reference dash structures 17 make it difficult, and in many cases practically impossible, to access the accessory unit rear side 24 while the accessory unit 20 remains in the dash receptacle 15, unless extensive disassembly of the dash 12 is undertaken.

Accessory units 20 are frequently one of the most expensive components of a vehicle 11 and they are often taken by thieves 18 who gain access to the unit 20 while in the passenger compartment. This means of removing the unit 20 must involve a forward movement of the unit 20, toward the passenger compartment and away from the dash 12.

Figure 3:
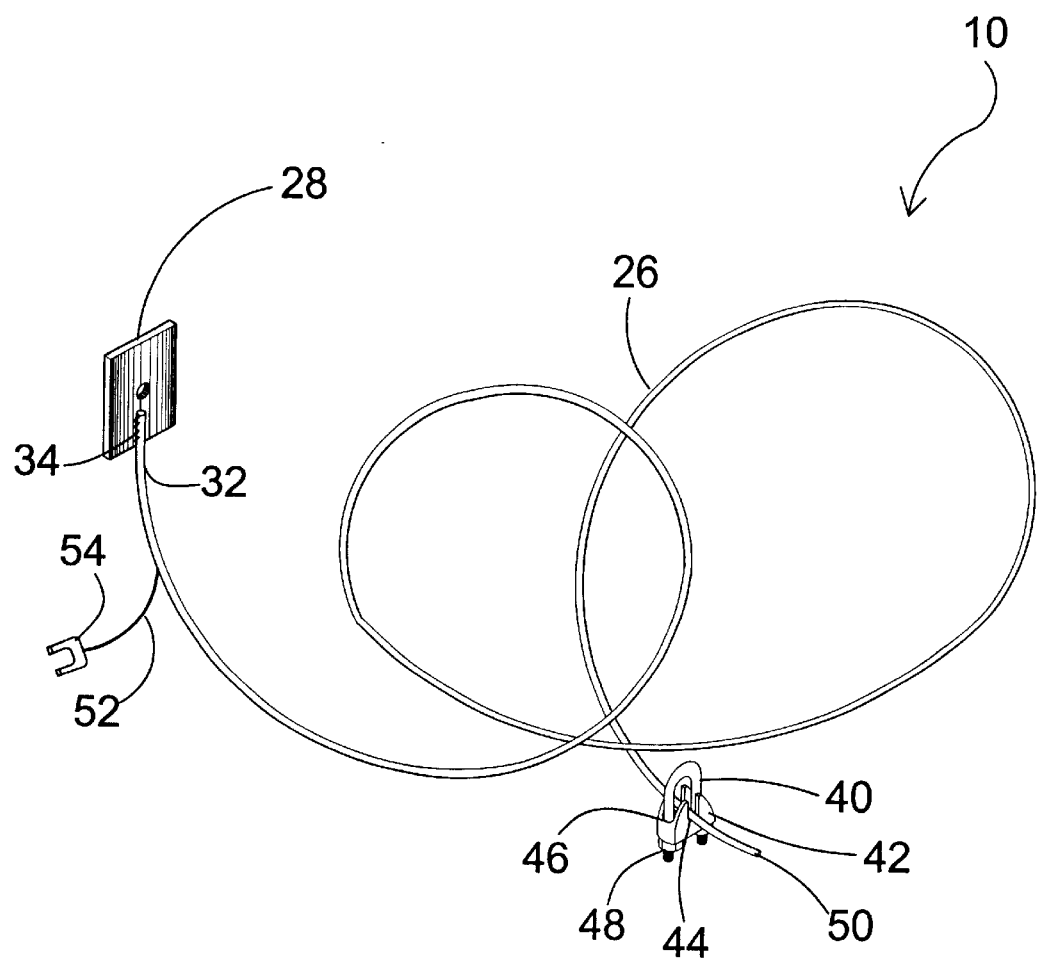
FIG. 3 is a perspective view of the present invention, apart from the dash and the accessory unit.
Figure 4:
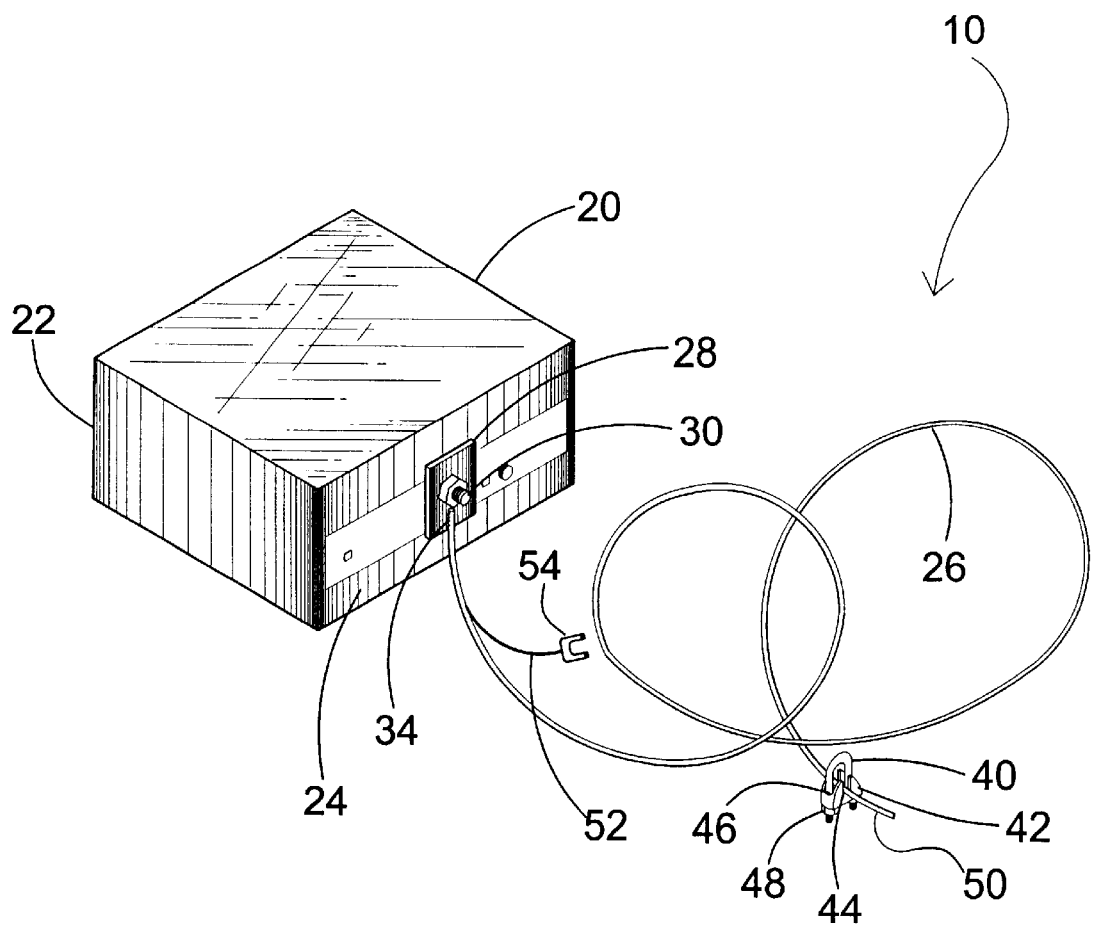
FIG. 4 is a perspective view of the present invention mounted to the rear side of an accessory unit.
Figure 6:
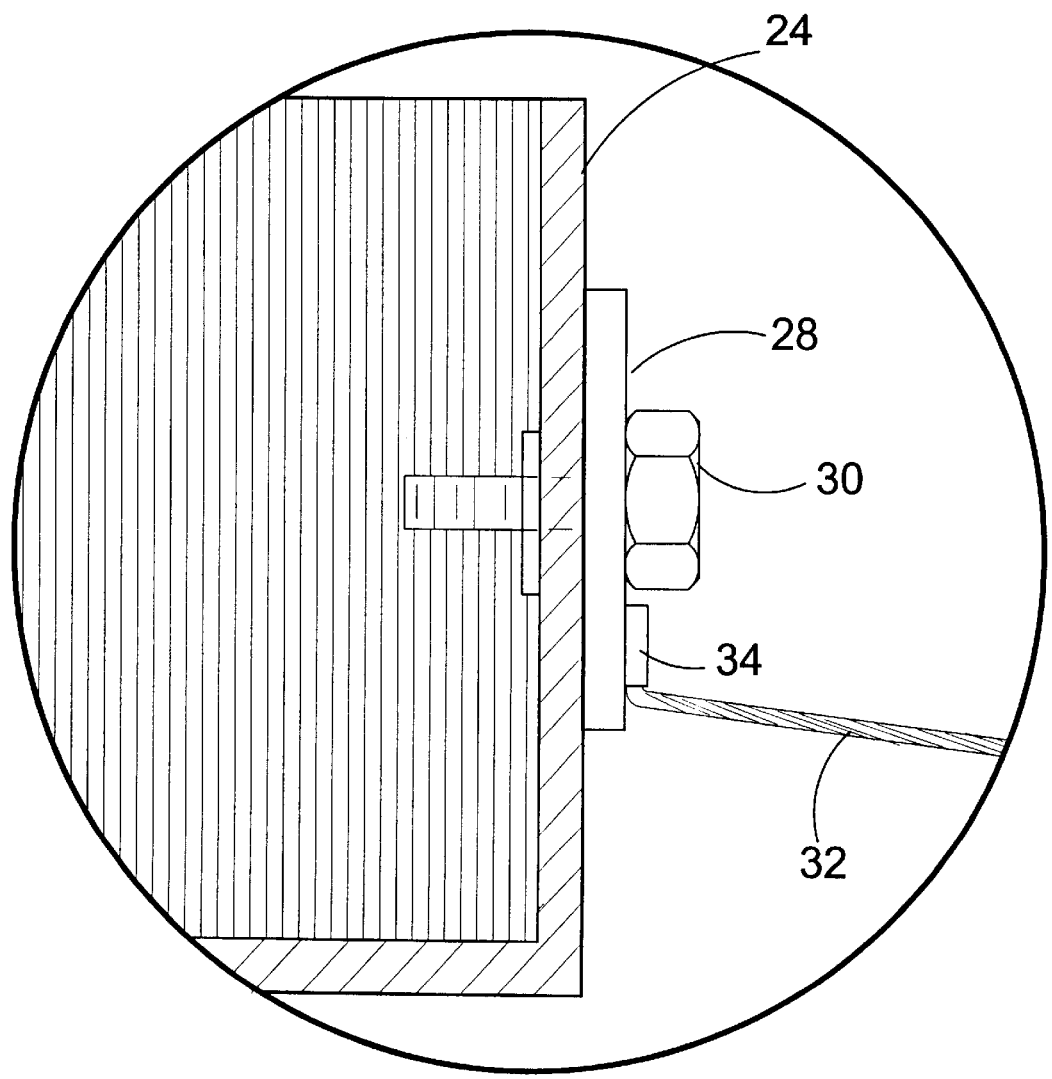
FIG. 6 is a side sectional view of the cable first end attachment components whereby the first end is attached to the accessory unit rear side.

As shown in FIG. 3 and FIG. 4, the present invention 10 has a non-stretchable, but otherwise flexible, cable 26 that is used to stop the forward movement of the unit 20 toward the passenger compartment. As shown further in FIG. 6, a mounting plate 28 and mounting plate bolt 30 are utilized, with the cable first end 32 attached to the plate 28 by a weld 34. The plate 28 is bolted to the accessory unit rear side 24. In other embodiments, this means for attaching the cable first end 32 to the accessory unit 20, includes attachment using other conventional fasteners, including screws, clamps, and the like, with the mounting plate being unnecessary in some embodiments.

In practice the attachment of the mounting plate 28 to the accessory unit 20 will be accomplished prior to the installation of the unit 20 in the dash 12. The cable 26 is threaded into the dash receptacle 15 during installation, and after the unit 20 is secured to the dash 12, the cable 26 is threaded and woven among the various dash structures/components 17 until finally being threaded through a hole 14 in the rear panel 13. This is shown in FIG. 5.

FIG. 3 depicts a grounding member in the form of a ground wire 52 with an open-washer type attachment 54 at the ground wire 52 end for attaching to an appropriate grounding structure, for protection of the accessory unit 20. This ground wire 52 is provided in a length sufficient to conveniently access the attachment 54 for such purposes.

Figure 7:
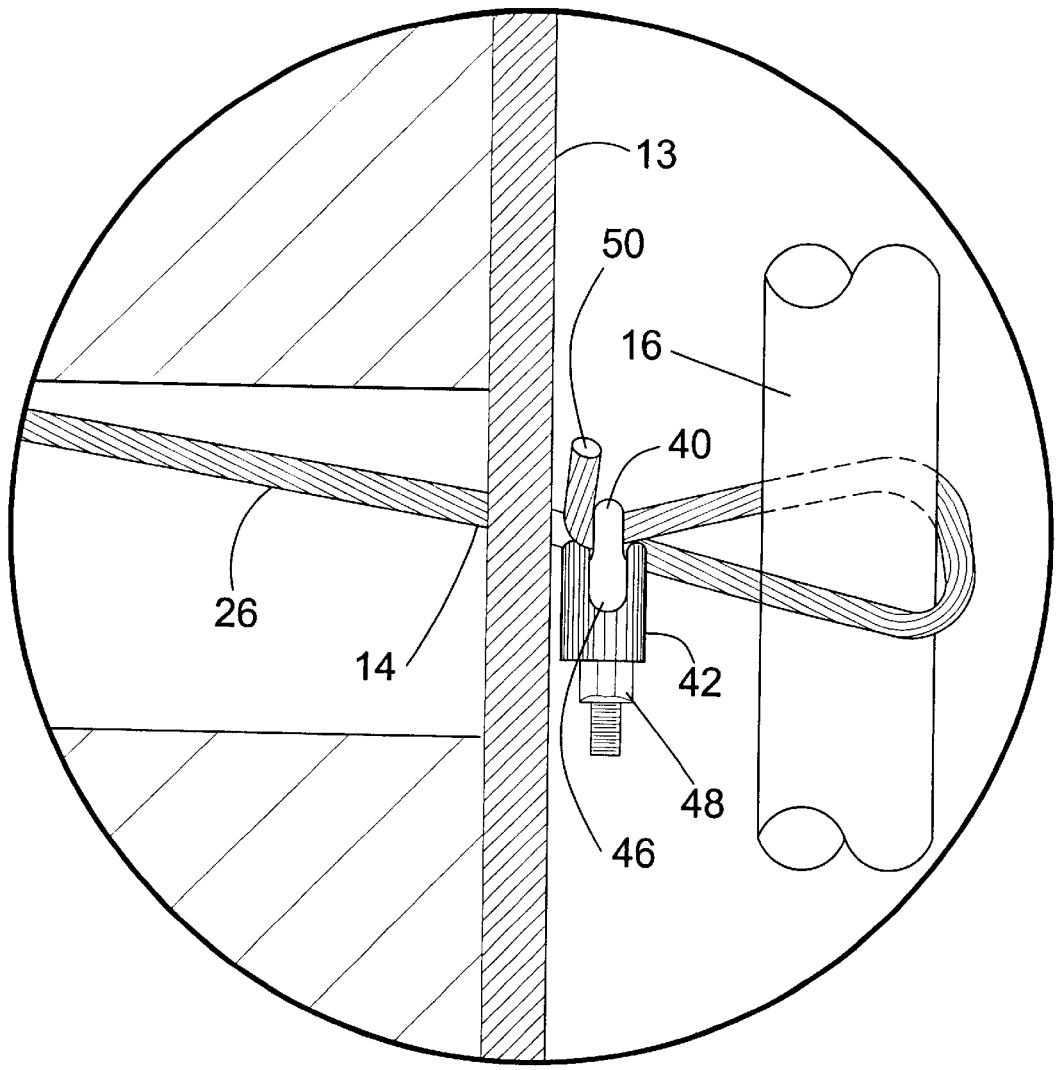
FIG. 7 is a side sectional view of the cable second end attachment components whereby the second end is attached to at least one vehicle rigid member outside the passenger compartment, the components allowing the cable to be drawn tight into tension as the attachment is completed.

As shown in FIG. 7, a means of attaching the cable 26 to a motor vehicle rigid member 16 is provided that has a U-bolt 40 and a closing member 42 that slips on the U-bolt 40. The closing member 42 has a transverse channel 44 and an aligned channel 46, the aligned channel 46 being aligned with the plane of the U-bolt 40, with a width to accommodate the U-bolt 40 diameter. The transverse channel 44 is generally perpendicular to the plane of the U-bolt 40. Nuts 48 are used to hold the closing member 42 on the U-bolt 40.

The cable second end 50, having exited the passenger compartment through the rear panel hole 14, is threaded into the opening formed by the U-bolt 40 and the un-tightened closing member 42, with the cable 26 being received within the transverse closing member channel 44. The cable second end 50 is then routed around the rigid member 16 and threaded back through the opening formed by the U-bolt 40 and the closing member 42.

Using pliers or other conventional tools, the cable second end 50 is then grasped and pulled tightly, to remove all, or substantially all, the slack in the cable 26. Once the slack is removed, the nuts 48 are rotated to force the closing member 42 to securely grasp the cable 26 (both portions) within the opening. The aligned channel 46 cooperates here to allow the closing member 42 to continue up the U-bolt 40 length even as the U-bolt 40 curved portion is encountered.

This securement of the cable 26 places in tension the length of cable 26 running between the accessory unit 20 and the rigid member 16, although the cable 26 may be routed around one or more dash components 17 such that bends are present in the cable 26, as shown in FIG. 5.

The thief in FIG. 2 now has been frustrated in his efforts to move the accessory unit 20 toward the passenger compartment where he could ordinarily finish cutting the unit loose from its attached wiring, and thus complete the theft. When the present invention is properly installed as described above, the unit 20 cannot move forward beyond what inconsequential slack might have entered the cable 26 during attachment of the cable second end 50 to the vehicle rigid member 16. This inability to bring the unit 20 forward can only be overcome by gaining access to the engine compartment, locating the secluded rigid member 16, and then disabling the attachment to such rigid member 16. Even this secondary theft plan pre-supposes that the thief 18 is aware of the means by which the owner has chosen to prevent the unit 20 from being removed from the dash receptacle 15, that is preventing the forward movement of the unit 20 toward the passenger compartment. In the absence of such knowledge, or in the absence of the significant amount of time it would take to gain such knowledge and then disable the attachment, the thief 18 is prevented from removing the unit 20.

With respect to the above description then, it is to be realized that the optimum material and dimensional relationships for the parts of the security apparatus 10, will include variations in size, materials, shape, and form, which will occur to those skilled in the art upon review of the present disclosure. For example, the cable 26, U-bolt 40, closing member 42, nuts 48, mounting plate 28, and mounting plate bolt 30 are, in various embodiments, made from stainless steel, and other metals, and/or plastics. The U-bolt assembly is replaced by conventional clamps in other embodiments, and the cable second end 50 is attached to conventional clamps placed about the vehicle rigid member 16 without using a looping arrangement in still more embodiments. In another embodiment, the cable has some stretch, the stretch being substantially removable during the attachment process to the vehicle rigid member 16.

all equivalent relationships to those illustrated in the drawings and described in the specification are intended to be encompassed by the present invention.

What is claimed as new and desired to be protected by Letters Patent is set forth in the appended claims:

1. An improved electronic accessory unit of the type installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, wherein the improvement comprises:

an elongated flexible member having a first end and a second end;

a first attachment device for attaching the elongated flexible member first end to the accessory unit rear side; and a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member.

2. The unit of claim 1, wherein the accessory unit has a threaded hole and wherein the first attachment device further comprises a mounting plate connected to the elongated flexible member first end, the plate having a hole, and a threaded fastener, the first attachment device hole receiving the threaded fastener and the accessory unit rear side threaded hole threadably receiving the threaded fastener.

3. The unit of claim 2, wherein the elongated flexible member is welded to the mounting plate.

4. The unit of claim 1, wherein the second attachment device is a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening.

5. The unit of claim 1, wherein the motor vehicle has a grounding structure and wherein the unit further comprises a ground member, the ground member having a first end, connected in proximity and in electrical communication to the elongated flexible member first end, and a second end for connecting to the motor vehicle grounding structure.

6. In combination with an electronic accessory unit installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, a security apparatus comprising:

an elongated flexible member having a first end and a second end;

a first attachment device for attaching the elongated flexible member first end to the accessory unit rear side; and a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member.

7. The apparatus of claim 6, wherein the accessory unit has a threaded hole and wherein the first attachment device further comprises a mounting plate connected to the elongated flexible member first end, the plate having a hole, and a threaded fastener, the first attachment device hole receiving the threaded fastener and the accessory unit rear side threaded hole threadably receiving the threaded fastener.

8. The apparatus of claim 7, wherein the elongated flexible member is welded to the mounting plate.

9. The apparatus of claim 1, wherein the second attachment device is a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening.

10. The apparatus of claim 1, wherein the motor vehicle has a grounding structure and wherein the apparatus further comprises a ground member, the ground member having a first end, connected in proximity and in electrical communication to the elongated flexible member first end, and a second end for connecting to the motor vehicle grounding structure.

11. An improved electronic accessory unit of the type installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, wherein the improvement comprises:

an elongated flexible member having a first end and a second end;

first end attachment means for attaching the elongated flexible member first end to the accessory unit rear side; and second end attachment means for attaching the elongated flexible member second end to at least one of the motor vehicle rigid members, the second end attachment means being adapted for tightening the elongated flexible member prior to the attachment, such that movement of the accessory unit from the dash receptacle is stopped by the elongated flexible member.

12. The unit of claim 11, wherein the motor vehicle has a grounding structure and wherein the elongated flexible member further comprises grounding means for connecting to the motor vehicle grounding structure.

13. In combination with an electronic accessory unit installed in a motor vehicle having a rear panel and a dash, the accessory unit having a front side and a rear side, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, a security apparatus comprising:

an elongated flexible member having a first end and a second end;

first end attachment means for attaching the elongated flexible member first end to the accessory unit rear side; and second end attachment means for attaching the elongated flexible member second end to at least one of the motor vehicle rigid members, the second end attachment means being adapted for tightening the elongated flexible member prior to the attachment, such that movement of the accessory unit from the dash receptacle is stopped by the elongated flexible member.

14. The apparatus of claim 13, wherein the motor vehicle has a grounding structure and wherein the apparatus further comprises grounding means for connecting to the motor vehicle grounding structure.

15. An improved electronic accessory unit of the type installed in a motor vehicle having a rear panel and a dash, the accessory unit having a front side and a rear side and a threaded hole, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, the motor vehicle further having a grounding structure, wherein the improvement comprises:

an elongated flexible member having a first end and a second end;

a first attachment device for attaching the elongated flexible member first end to the accessory unit rear side, the first attachment device having a mounting plate welded to the elongated flexible member first end, the plate having a hole, and a threaded fastener, the first attachment device hole receiving the threaded fastener and the accessory unit rear side threaded hole threadably receiving the threaded fastener;

a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member, the second attachment device comprising a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening; and a ground member, the ground member having a first end, connected in proximity and in electrical communication to the elongated flexible member first end, and a second end for connecting to the motor vehicle grounding structure.

16. In combination with an electronic accessory unit installed in a motor vehicle having a rear panel and a dash, the accessory unit having a front side and a rear side and a threaded hole, the rear panel having a hole, the dash having a receptacle for receiving and positioning the accessory unit such that the accessory unit front side is passenger-accessible from within the vehicle, and further such that the accessory unit rear side is installed into the dash receptacle, the motor vehicle having at least one rigid member, the at least one member being separated from the accessory unit by the rear panel, the motor vehicle further having a grounding structure, a security apparatus comprising:

an elongated flexible member having a first end and a second end;

a first attachment device for attaching the elongated flexible member first end to the accessory unit rear side, the first attachment device having a mounting plate welded to the elongated flexible member first end, the plate having a hole, and a threaded fastener, the first attachment device hole receiving the threaded fastener and the accessory unit rear side threaded hole threadably receiving the threaded fastener;

a second attachment device for attaching the elongated flexible member second end to at least one of the motor vehicle rigid members, the second attachment device being adapted for tightening the elongated flexible member prior to the attachment, such that movement of the accessory unit from the dash receptacle is stopped by the elongated flexible member, the second attachment device comprising a U-bolt having a closing member, the closing member being positionable on the U-bolt such that the U-bolt and closing member form an opening, the flexible elongated member being threaded through the opening, around at least one of the motor vehicle rigid members, and back through the opening, the closing member being tightenable on the U-bolt such that the flexible elongated member is held in the opening; and a ground member, the ground member having a first end, connected in proximity and in electrical communication to the elongated flexible member first end, and a second end for connecting to the motor vehicle grounding structure.

* * * * *